(12) United States Patent
Nefcy et al.

(10) Patent No.: US 9,657,831 B2
(45) Date of Patent: May 23, 2017

(54) METHODS AND SYSTEMS FOR IMPROVING HYBRID VEHICLE COOLING

(71) Applicant: Ford Global Technologies, LLC, Dearborn, MI (US)

(72) Inventors: Bernard D. Nefcy, Novi, MI (US); Marvin Paul Kraska, Dearborn, MI (US); Walter Joseph Ortmann, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 150 days.

(21) Appl. No.: 14/302,142

(22) Filed: Jun. 11, 2014

(65) Prior Publication Data

US 2015/0360675 A1    Dec. 17, 2015

(51) Int. Cl.
*B60W 20/00*  (2016.01)
*F16H 61/00*  (2006.01)
*F16H 57/04*  (2010.01)
*B60W 20/14*  (2016.01)

(52) U.S. Cl.
CPC ......... *F16H 57/0476* (2013.01); *B60W 20/14* (2016.01); *F16H 57/0413* (2013.01); *F16H 61/0031* (2013.01); *F16H 2061/0037* (2013.01); *Y10S 903/902* (2013.01)

(58) Field of Classification Search
CPC ............. F16H 57/0467; F16H 57/0412; F16H 57/0413; F16H 2061/0037; F16H 61/0031; F16H 57/04; F16H 57/0476; F16H 57/0434; F16H 57/0436; F16H 57/0439; F16H 57/0446; F16H 61/4165; B60W 30/18127; B60W 20/00; B60W 20/14

USPC ......................................................... 701/22
See application file for complete search history.

(56) References Cited

U.S. PATENT DOCUMENTS

| | | | |
|---|---|---|---|
| 8,649,925 B2 | 2/2014 | Light et al. | |
| 8,909,402 B2 * | 12/2014 | Miyamoto | B60W 20/00 180/65.27 |
| 2004/0045749 A1 | 3/2004 | Jaura et al. | |
| 2006/0223670 A1 * | 10/2006 | Nishikawa | B60K 6/387 477/168 |
| 2006/0240939 A1 * | 10/2006 | Foster | F16H 57/0413 477/3 |

(Continued)

FOREIGN PATENT DOCUMENTS

| | | | |
|---|---|---|---|
| JP | 2007309127 A | * | 11/2007 |
| JP | 2012210850 A | * | 11/2012 |

OTHER PUBLICATIONS

Boesch, Mathew A., "Combined Coolant and Transmission Pump Motor Drive for Stop-Start Vehicle," U.S. Appl. No. 14/174,186, filed Feb. 6, 2014, 20 pages.

*Primary Examiner* — Thomas G Black
*Assistant Examiner* — Sara Lewandroski
(74) *Attorney, Agent, or Firm* — David Kelley; McCoy Russell LLP (57) ABSTRACT

Systems and methods for improving hybrid vehicle cooling are presented. In one example, an electric pump may supply transmission fluid to a transmission and a driveline integrated starter/generator to cool, operate, and lubricate driveline components. The electric pump may be selectively operated to conserve energy and to supply driveline cooling when driveline cooling may be desirable.

11 Claims, 4 Drawing Sheets

(56) References Cited

U.S. PATENT DOCUMENTS

| | | | |
|---|---|---|---|
| 2007/0202989 A1* | 8/2007 | Ortmann | B60K 6/387 |
| | | | 477/166 |
| 2009/0095548 A1* | 4/2009 | Tamba | B60K 6/365 |
| | | | 180/65.21 |
| 2009/0111651 A1* | 4/2009 | Gale | F16H 59/72 |
| | | | 477/98 |
| 2009/0241872 A1* | 10/2009 | Wang | F01L 9/04 |
| | | | 123/90.11 |
| 2009/0242290 A1* | 10/2009 | Kobayashi | F16H 61/12 |
| | | | 180/65.265 |
| 2010/0320019 A1* | 12/2010 | Gale | B60K 6/445 |
| | | | 180/65.27 |
| 2011/0166727 A1* | 7/2011 | Light | B60K 6/445 |
| | | | 701/22 |
| 2011/0214629 A1 | 9/2011 | Benoit | |
| 2012/0143414 A1 | 6/2012 | Shin et al. | |
| 2013/0014911 A1* | 1/2013 | Lee | B60W 20/00 |
| | | | 165/51 |
| 2014/0175867 A1* | 6/2014 | Sung | F16H 57/0412 |
| | | | 307/9.1 |
| 2014/0262195 A1* | 9/2014 | Lee | B60K 11/02 |
| | | | 165/200 |
| 2015/0051768 A1* | 2/2015 | Miyamoto | B60W 20/00 |
| | | | 701/22 |
| 2015/0057858 A1* | 2/2015 | Nitta | F01M 1/02 |
| | | | 701/22 |
| 2016/0082824 A1* | 3/2016 | Inoue | B60K 6/48 |
| | | | 701/22 |

* cited by examiner

METHODS AND SYSTEMS FOR IMPROVING HYBRID VEHICLE COOLING

FIELD

The present description relates to a system and methods for improving cooling of a hybrid vehicle. The methods may be particularly useful for hybrid vehicles that include regenerative braking.

BACKGROUND AND SUMMARY

A hybrid vehicle may recharge an electrical energy storage device during braking, while maintaining vehicle speed down a hill in cruise control, and during pedal off deceleration (e.g., accelerator and brakes not applied) via regenerative braking. In particular, the electrical energy storage device may be recharged by converting the vehicle's kinetic energy into electrical energy by operating an electric machine in a generator mode. However, it may not be possible to convert all of the vehicle's kinetic energy into electrical energy for several reasons. For example, if the electric machine is producing a large amount of current, the electric machine's temperature may increase to a level where the electric machine's current is reduced to lower the possibility of degrading the electric machine. As a result, a portion of the vehicle's kinetic energy may be converted into heat energy by vehicle brakes for the vehicle to follow a desired deceleration rate. The heat energy produced by the vehicle brakes may be lost to the atmosphere, thereby reducing the vehicle's ability to recover and conserve energy.

The inventors herein have recognized the above-mentioned disadvantages and have developed a method for cooling a driveline, comprising: operating an electric pump to supply transmission clutches transmission fluid when an engine and an electric machine are stopped; deactivating the electric pump in response to rotation of the engine or the electric machine in response to electric machine temperature less than a threshold; and operating the electric pump while the electric machine is rotating in response to an electric machine temperature exceeding the threshold.

By selectively operating an electric pump, it may be possible to provide the technical result of improved driveline cooling during regenerative braking. Specifically, an electric pump that supplies transmission clutches transmission fluid when a driveline is not being rotated by an engine or electric machine may also be operated when the electric machine is rotating to provide an increased flow rate of transmission fluid to increase electric machine cooling. The electric pump may be operated at the same time as a mechanical pump so that both pumps provide transmission fluid to cool the electric machine during times of increased heat generation by the electric machine. For example, the electric pump may supply transmission fluid to the electric machine when the electric machine is converting the vehicle's kinetic energy into electrical energy.

The present description may provide several advantages. In particular, the approach may improve driveline component cooling. Additionally, the approach may conserve energy when driveline cooling requirements are low and improve driveline cooling when additional driveline cooling may be desired. Further still, the approach may provide additional driveline cooling without additional expense.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
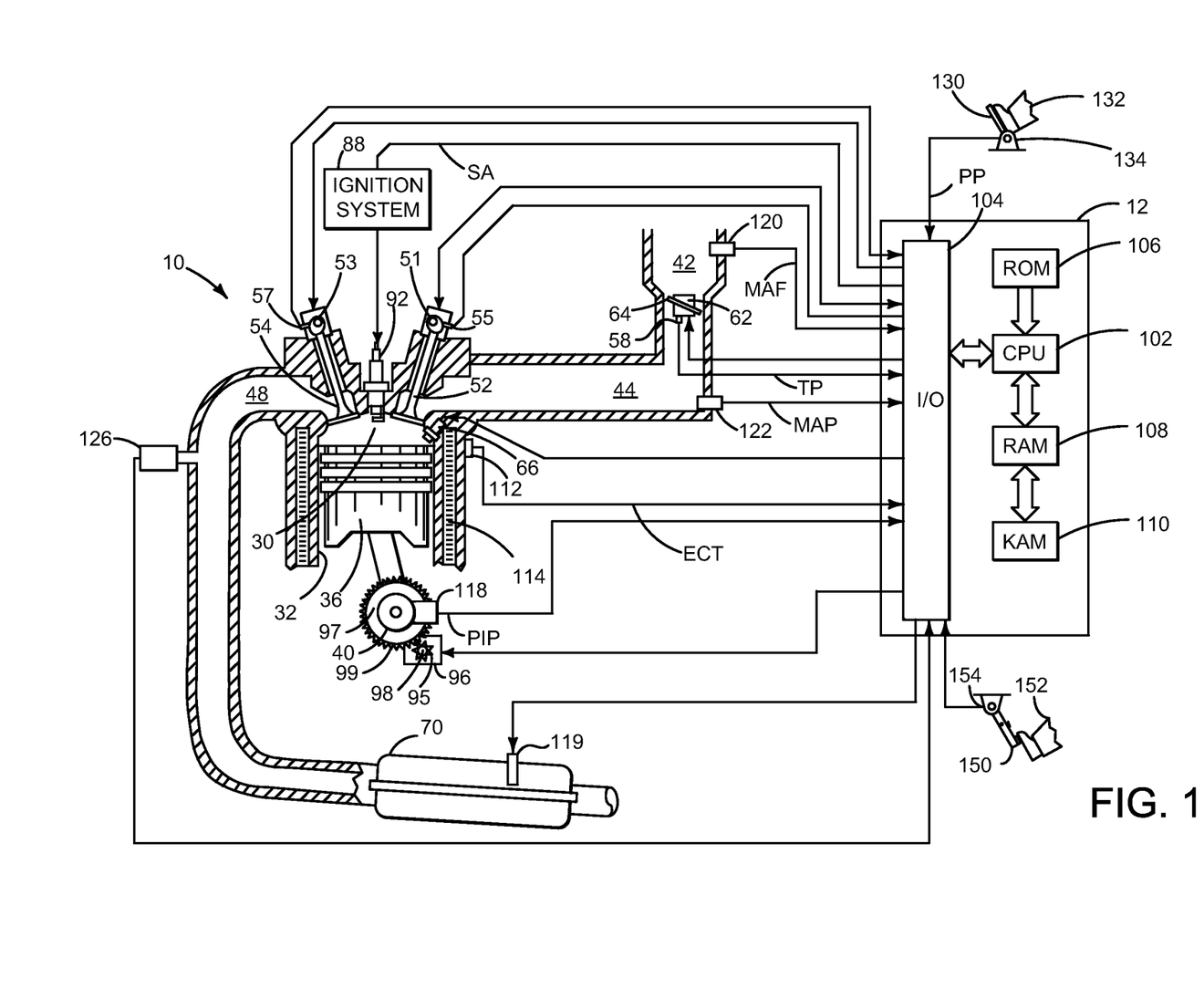
FIG. 1 is a schematic diagram of an engine.
Figure 2:
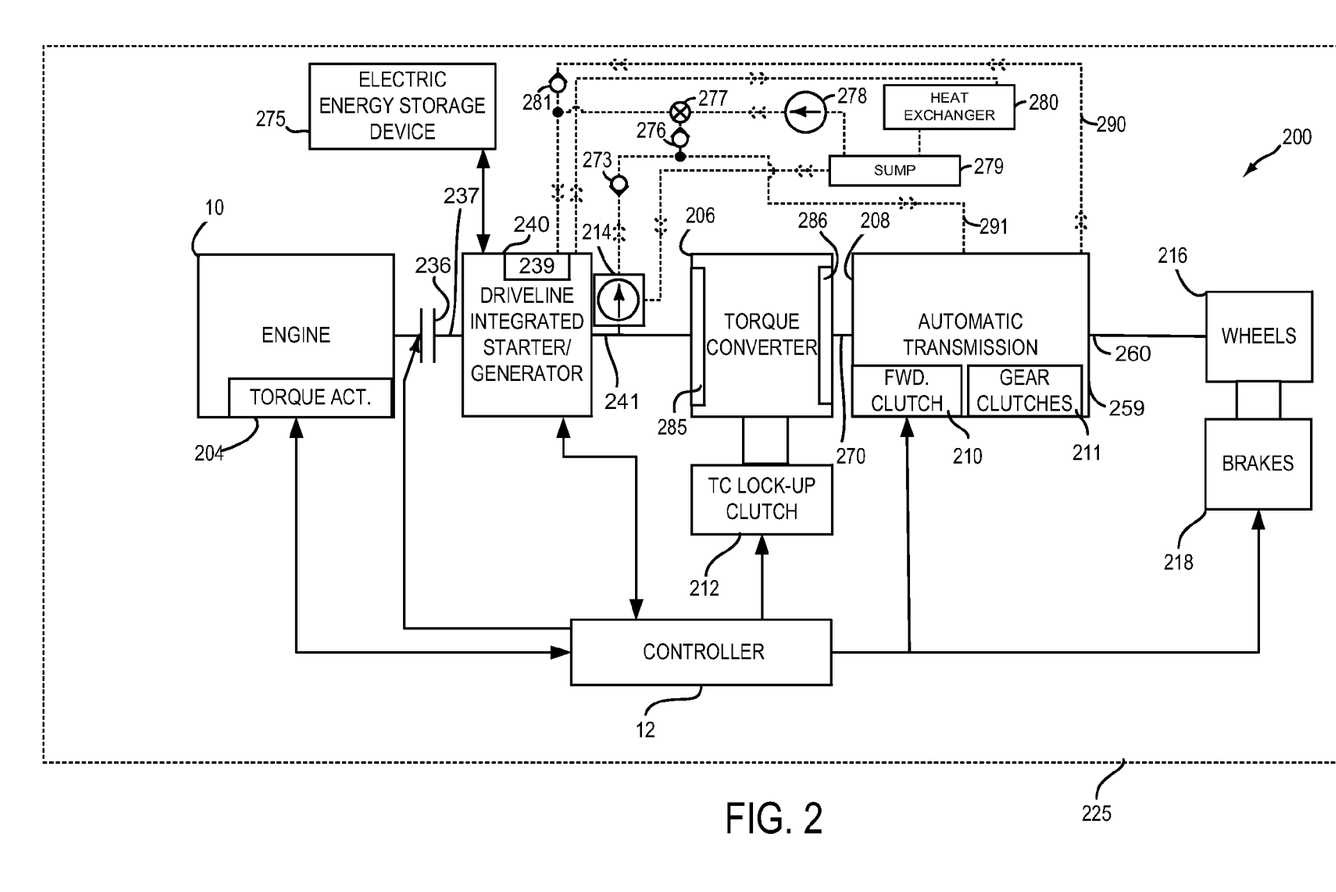
FIG. 2 shows an example vehicle driveline configuration.
Figure 3:
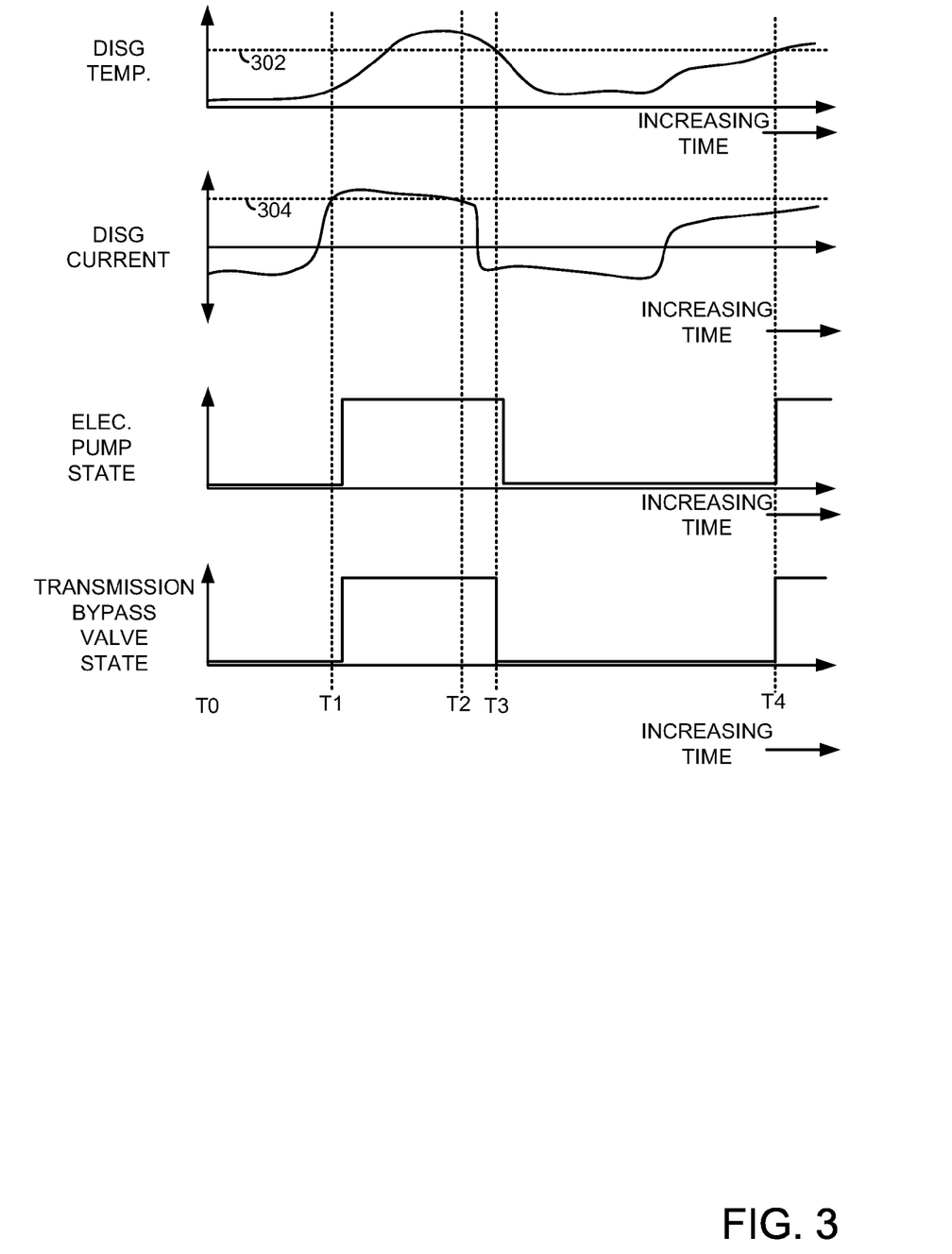
FIG. 3 shows an example simulated driveline cooling sequence.

The present description is related to controlling driveline cooling of a hybrid vehicle. The driveline may include an engine as is shown in FIG. 1. The engine may be mechanically coupled to other vehicle components to form a driveline as is shown in FIG. 2. The driveline may include an electric machine for propelling the vehicle and an electric pump for supplying transmission fluid to transmission clutches when the engine and electric machine are not rotating. The electric pump may also be operated when the engine and/or electric machine are rotating to provide additional cooling to the electric machine as is shown in FIG. 3. The electric pump may be operated according to the method of FIG. 4 to provide the operating sequence of FIG. 3.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200. The driveline of FIG. 2 includes engine 10 shown in FIG. 1. Mechanical devices are shown using solid lines while hydraulic passages 290 are show as dotted lines with arrows indicating transmission fluid flow direction.

Driveline 200 may be powered by engine 10. Engine 10 may be started with an engine starting system shown in FIG. 1 or via driveline integrated starter/generator (DISG) 240. Further, torque of engine 10 may be adjusted via torque actuator 204, such as a fuel injector, throttle, etc.

An engine output torque may be transmitted to an input side of driveline disconnect clutch 236. Disconnect clutch 236 may be electrically or hydraulically actuated. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 and mechanical transmission pump 214 via shaft 241. The upstream side of the DISG 240 is mechanically coupled to the disconnect clutch 236.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 via passage 291 to provide hydraulic pressure to engage various clutches, such as forward clutch 210, gear clutches 211, and/or torque converter lock-up clutch 212. Mechanical oil pump 214 is also in fluid communication with DISG 240 to cool DISG armature and/or stator windings 239. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases. Mechanical oil pump 214 draws oil from sump 279. Oil is cooled via heat exchanger 280 before entering sump 279. However, in some examples, heat exchanger 280 may be positioned between mechanical pump 214 and sump 279. As shown, mechanical pump supplies oil or transmission fluid to automatic transmission 208 and the oil then flows to cool DISG 240 before being returned to sump 279 by way of heat exchanger 280.

Driveline 200 also includes electric pump 278 for supplying oil or transmission fluid to automatic transmission 208 and DISG 240 when shaft 241 is not rotating. Oil output from electric pump 278 may flow through three-way valve 277 and check valve 276 to reach passage 291 before proceeding to transmission 208 and DISG 240. Check valve 276 limits oil flow from mechanical pump 214 to electrical pump 278, and check valve 273 limits oil flow from electric pump 278 to mechanical pump 214. Electric pump 278 draws oil or transmission fluid from sump 279.

Alternatively, electric pump 278 may supply oil or transmission fluid directly to DISG 240 by way of valve 277. Check valve 281 limits oil flow from electric pump 278 to transmission 208 when electric pump 278 supplies oil directly to DISG 240. Electric pump 278 may be activated when engine 10 and/or DISG 240 are or are not rotating. In one example, electric pump 278 supplies oil to clutches 211, thereby holding the operating states of clutches 211 to limit vehicle motion when vehicle 225 is stopped.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 42 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by craning engine 10 and resuming cylinder combustion.

Thus, the system of FIGS. 1 and 2 provides for a driveline system, comprising: an engine; an electric machine; a transmission mechanically coupled to the electric machine; a driveline disconnect clutch selectively coupling the engine and the electric machine; an electric pump supplying transmission fluid to the electric machine and the transmission; and a controller including executable instructions stored in non-transitory memory for operating the electric pump to supply transmission fluid to the electric machine while the electric machine is rotating in response to a temperature of the electric machine exceeding a threshold. The system includes where the electric pump supplies transmission fluid to the electric machine via a valve. The system includes where the valve selectively allows fluid communication between a mechanical pump and the electric pump. The system includes where the mechanical pump is driven via the engine or the electric machine. The system further comprises a check valve positioned between the mechanical pump and the electric pump. The system further comprises a sump and where the mechanical pump and the electric pump draw transmission fluid from the sump.

Referring now to FIG. 3, a simulated driveline cooling sequence is shown. The operating sequence of FIG. 3 may be provided by the system of FIGS. 1 and 2 when instructions according to the method of FIG. 4 stored in non-transitory memory are executed. Vertical markers T0-T4 represent times of interest during the sequence.

The first plot from the top of FIG. 3 is a plot of DISG temperature versus time. The X axis represents time and time increases from the left side of FIG. 3 to the right side of FIG. 3. The Y axis represents DISG temperature and DISG temperature increases in the direction of the Y axis arrow. Horizontal line 302 represents a threshold temperature above which the electric pump is activated to increase DISG cooling.

The second plot from the top of FIG. 3 is a plot of DISG current versus time. The X axis represents time and time increases from the left side of FIG. 3 to the right side of FIG. 3 the X axis also is at a level of zero DISG current along the Y axis. The Y axis represents DISG current. DISG current above the X axis represents positive current produced by the DISG during regenerative braking DISG current below the X axis represents negative current consumed by the DISG to start or assist the engine.

The third plot from the top of FIG. 3 is a plot of electric motor state (e.g., operating or stopped) versus time. The X axis represents time and time increases from the left side of FIG. 3 to the right side of FIG. 3. The Y axis represents electric motor state. The electric motor is operating when the trace is at a higher level near the Y axis arrow. The electric motor is not operating when the trace is at a lower level near the X axis.

The fourth plot from the top of FIG. 3 is a plot of transmission bypass valve (e.g., valve 277 of FIG. 2) versus time. The X axis represents time and time increases from the left side of FIG. 3 to the right side of FIG. 3. The Y axis represents transmission bypass valve state. The transmission bypass valve allows oil or transmission fluid to be pumped directly to the DISG when the trace is at a higher level. The transmission bypass valve allows oil or transmission fluid to be pumped to the transmission when the trace is at a lower level.

At time T0, the DISG temperature is low and the DISG current is negative indicating that the DISG is providing torque to the driveline to propel the vehicle or assist the engine. The electric pump is off and the transmission bypass valve is not directing oil to the DISG. As time approaches time T1, the DISG current switches from negative to positive indicating that the DISG has entered regenerative braking mode in response to requested vehicle braking (not shown). The DISG temperature also begins to increase as the DISG converts the vehicle's kinetic energy into electrical energy.

At time T1, the DISG current exceeds threshold 304. The electric pump is activated in response to DISG current exceeding threshold 304 for a predetermined amount of time after time T1. The DISG temperature has not exceeded temperature threshold 302 at time T1, but the DISG temperature is increasing toward threshold 304. In this way, DISG current may be used to anticipate DISG temperature exceeding a threshold temperature so that the electric pump may be activated to provide additional cooling to the DISG by increasing oil or transmission fluid flow to the DISG. The transmission bypass valve state is transitioned to a state where oil is allowed to flow from the electric pump directly to the DISG without passing through the transmission valve body.

Between time T1 and time T2, the DISG temperature increases to a level above temperature threshold 302 and DISG current remains above threshold 304. Consequently, the electric pump remains activated and supplying coolant to the DISG.

At time T2, the DISG current is reduced in response to the vehicle exiting regenerative braking mode. However, the electric pump remains active since the DISG temperature remains above threshold temperature 302. The transmission bypass is positioned to allow flow from the electric pump to the DISG.

At time T3, the DISG temperature is reduced to a level below threshold 302 and the DISG current remains below threshold 304. The electric pump is deactivated in response to DISG temperature being below threshold 302 and the transmission bypass valve state transitions to direct oil flow from the electric pump to the transmission.

Between time T3 and time T4, the DISG current switches from negative to positive to indicate that the vehicle is entering regenerative braking. However, the DISG current remains below threshold 304. The DISG temperature begins to increase as the DISG is converting the vehicle's kinetic energy into electrical energy.

At time T4, the DISG temperature exceeds threshold 302. The electric pump is activated in response to the DISG temperature exceeding threshold 302. The DISG current remains below threshold 304 and the transmission bypass valve state is adjusted to allow oil to flow directly from the electric pump to the DISG.

Figure 4:
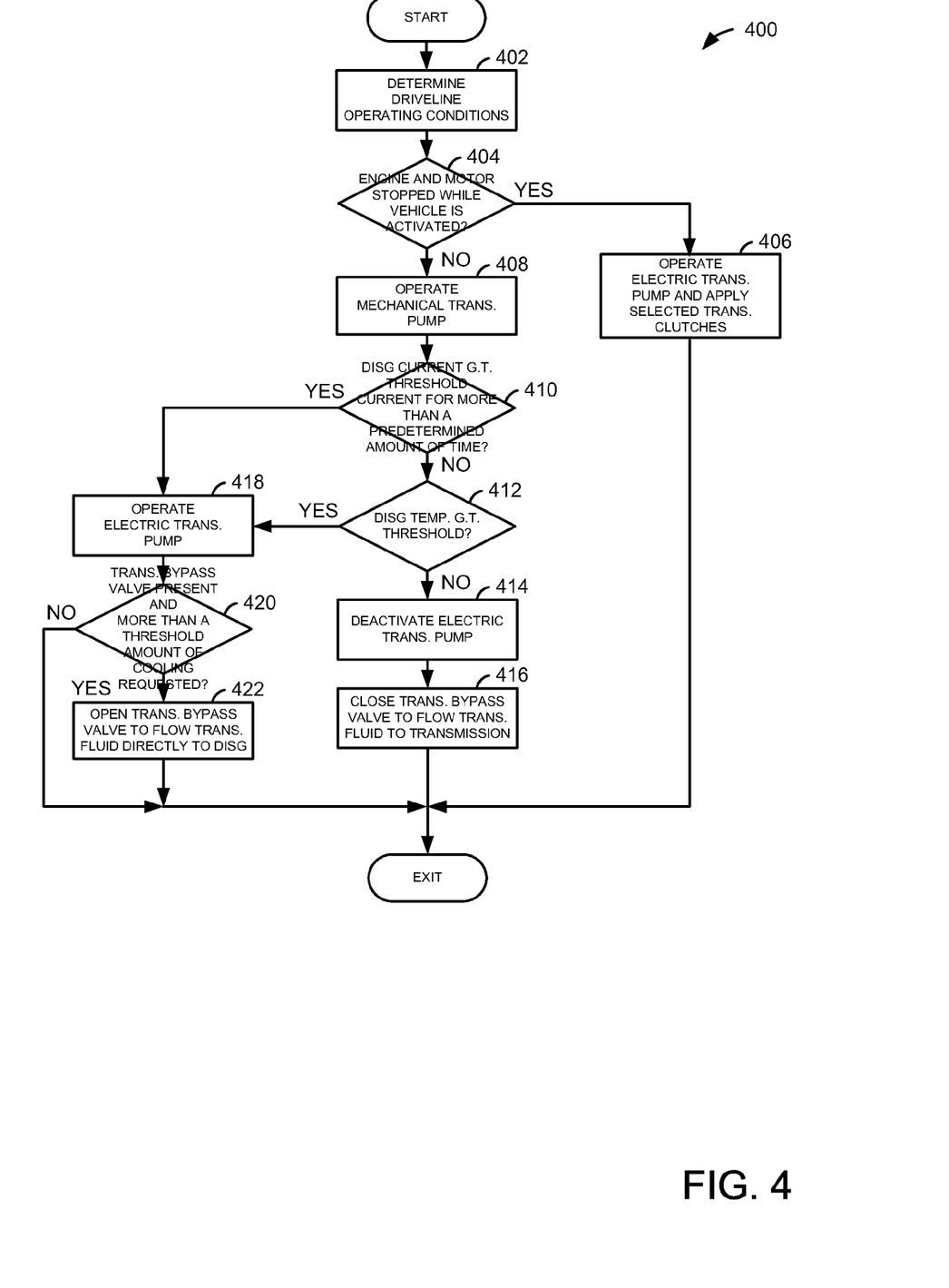
FIG. 4 is a flowchart of an example method for improving driveline cooling.

Referring now to FIG. 4, a flowchart of a method for improving driveline cooling is shown. The method of FIG. 4 may be included in the system of FIGS. 1 and 2 as executable instructions stored in non-transitory memory. Further, the method may provide the sequence shown in FIG. 3.

At 402, method 400 determines driveline operating conditions. Driveline conditions may include but are not limited to engine speed, engine load, driver demand torque, vehicle speed, ambient temperature and pressure, DISG current, DISG temperature, and engine temperature. Method 400 proceeds to 404 after driveline operating conditions are determined.

At 404, method 400 judges if the engine and electric machine are not rotating while the vehicle is activated (e.g., occupied and being operated by a driver). In one example, method 400 judges that the engine and electric machine are not rotating when driveline position is not changing. Method 400 judges that the vehicle is occupied and operated by a driver in response to a key or security token being proximate to the vehicle. If method 400 judges that the engine and electric machine are not rotating while the vehicle is activated, the answer is yes and method 400 proceeds to 406. Otherwise, the answer is no and method 400 proceeds to 408.

At 406, method 400 operates the electric pump and it supplies oil or transmission fluid to transmission clutches so that the clutches may activate one or more gear clutches. In one example, the one or more gear clutches are activated to tie the transmission input or output shaft to the transmission case, thereby holding the vehicle in place. Further, oil or transmission fluid may be supplied to the DISG to cool the DISG while the DISG is not rotating. Method 400 proceeds to exit after the electric pump is activated.

At 408, method 400 operates the mechanical transmission pump. The mechanical pump may be mechanically coupled to the transmission input shaft so that the mechanical pump rotates when either the engine or the electric machine rotates. If the engine is rotating the driveline disconnect clutch needs to be closed for the mechanical pump to rotate with the engine. The mechanical pump draws oil or transmission fluid from a sump and supplies the oil to the transmission to activate clutches and to the DISG to provide cooling. Method 400 proceeds to 410 after the mechanical pump is activated.

At 410, method 400 judges if DISG current is greater than (G.T.) a threshold for more than a threshold amount of time. DISG current may be determined via a current sensor. If method 400 judges that DISG current is greater than the threshold for more than the threshold amount of time, the answer is yes and method 400 proceeds to 418. Otherwise, the answer is no and method 400 proceeds to 412.

At 418, the electric transmission pump is operated and it may supply transmission fluid or oil to the DISG and/or the transmission for applying transmission clutches. The electric transmission pump is activated by supplying electrical power to the pump. Method 400 proceeds to 420 after the electric transmission pump is activated.

At 420, method 400 judges if a transmission bypass valve (e.g., valve 277 of FIG. 2) is present and if more than a threshold amount of DISG cooling is requested. The transmission bypass valve may be judged to be present if a bit or variable stored in memory takes on a predetermined value (e.g., one). Method 400 may judge that more than a threshold amount of cooling is requested based on DISG temperature and/or DISG current. If method 400 judges that the transmission bypass valve is present and more than a threshold amount of DISG cooling is requested, the answer is yes and method 400 proceeds to 422. Otherwise, the answer is no and method 400 proceeds to exit.

At 422, method 400 opens the bypass valve to flow transmission fluid directly to the DISG. Method 400 proceeds to exit.

At 412, method 400 judges if DISG temperature is greater than (G.T.) a threshold temperature. DISG temperature may be determined via a sensor or inferred from DISG speed and DISG current. If method 400 judges that DISG temperature is greater than a threshold, the answer is yes and method 400 proceeds to 418. Otherwise, the answer is no and method 400 proceeds to 414.

At 414, method 400 deactivates the electric transmission pump. The electric transmission pump may be deactivated by decoupling the electric transmission pump from electrical power. Method 400 proceeds to 416 after the electric transmission pump is deactivated.

At 416, method 400 operates the transmission bypass valve to flow transmission from the electric pump to the transmission. The transmission bypass valve directs oil flow from the electric transmission pump to the transmission so that transmission clutches may be held in desired states if the vehicle stops and the engine and DISG stop rotating. Method 400 proceeds to exit after the transmission bypass valve position is adjusted.

In this way, the method of FIG. 4 provides for selectively operating an electric transmission pump to cool the DISG when the mechanical transmission pump may lack the capacity to provide a desired amount of DISG cooling. Additionally, the electric transmission pump may be activated when the vehicle stops without the engine and DISG rotating.

Thus, the method of FIG. 4 provides for a method for cooling a driveline, comprising: operating an electric pump to supply transmission clutches transmission fluid when an engine and an electric machine are stopped; deactivating the electric pump in response to rotation of the engine or the electric machine in response to electric machine temperature less than a threshold; and operating the electric pump while the electric machine is rotating in response to an electric machine temperature exceeding the threshold. The method includes where the electric machine is mechanically coupled to a transmission that includes the transmission clutches.

In some examples, the method further comprises rotating a mechanical pump and supplying transmission fluid to the transmission clutches via the mechanical pump. The method includes where the electric pump supplies transmission fluid to the electric machine when the electric machine is rotating. The method also includes where the transmission fluid is supplied to the electric machine, directly from a heat exchanger to the electric pump, and directly from the electric pump to the electric machine. The method further comprises supplying transmission fluid to the electric machine via a mechanical pump, the mechanical pump rotated by the electric machine. The method includes where a flow rate of transmission fluid supplied to the electric machine is increased in response to the temperature of the electric machine exceeding the threshold.

The method of FIG. 4 also provides for cooling a driveline, comprising: operating an electric pump supplying transmission clutches transmission fluid when an electric machine coupled to a transmission is not rotating; deactivating the electric pump in response to electric machine rotation when electric machine current output is less than a threshold; and operating the electric pump while the electric machine is rotating in response to electric machine current output exceeding a threshold for a predetermined amount of time. The method further comprises supplying transmission fluid to the electric machine directly via the electric machine and a three-way valve.

The method also includes where the three-way valve selectively directly routes transmission fluid from the electric pump to the electric machine or a transmission. The method further comprises supplying transmission fluid to the electric machine via a mechanical pump. The method includes where the mechanical pump is rotated when the electrical machine is rotating. The method includes where electric pump supplies transmission fluid that has passed through a heat exchanger to the electric machine. The method further comprises supplying transmission fluid to windings of the electric machine via the electric pump.

As will be appreciated by one of ordinary skill in the art, method described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for cooling a driveline, comprising:
   operating an electric pump to supply transmission clutches transmission fluid when an engine and an electric machine are stopped, where the electric machine is mechanically coupled to a transmission that includes the transmission clutches;
   supplying transmission fluid to the electric machine from the electric pump via adjusting a valve to a first position in response to an electric machine temperature exceeding a threshold;
   adjusting the valve to a second position in response to the electric machine temperature being less than the threshold; and
   supplying transmission fluid to the electric machine from the electric pump via adjusting the valve to the first position in further response to a current of the electric machine exceeding a threshold for more than a predetermined amount of time.

2. The method of claim 1, further comprising rotating a mechanical pump and supplying transmission fluid to the transmission clutches via the mechanical pump while supplying transmission fluid directly to the electric machine via a valve positioned downstream of the electric pump.

3. The method of claim 1, further comprising deactivating the electric pump in response to rotation of the engine or the electric machine and in response to the electric machine temperature less than the threshold, and where the electric pump supplies transmission fluid to the electric machine when the electric machine is rotating.

4. The method of claim 3, where the transmission fluid is supplied to the electric machine, directly from a heat exchanger to the electric pump, and directly from the electric pump to the electric machine.

5. The method of claim 4, further comprising supplying transmission fluid to the electric machine via a mechanical pump, the mechanical pump rotated by the electric machine.

6. The method of claim 5, where a flow rate of transmission fluid supplied to the electric machine is increased in response to the temperature of the electric machine exceeding the threshold.

7. A driveline system, comprising:
an engine;
an electric machine;
a transmission mechanically coupled to the electric machine;
a driveline disconnect clutch selectively coupling the engine and the electric machine;
an electric pump;
a bypass valve selectively directing transmission fluid from the electric pump to the electric machine in a first position and to the transmission in a second position;
a mechanical pump, a first check valve limiting transmission fluid flow from the electric pump to the mechanical pump, and a second check valve limiting transmission fluid flow from the mechanical pump to the bypass valve and the electric pump; and
a controller including executable instructions stored in non-transitory memory for operating the electric pump to supply transmission fluid to the electric machine while the electric machine is rotating via adjusting a position of the bypass valve in response to a temperature of the electric machine exceeding a threshold.

8. The system of claim 7, where the second check valve selectively allows fluid communication between the mechanical pump and the electric pump.

9. The system of claim 8, where the mechanical pump is driven via the engine or the electric machine.

10. The system of claim 8, where the first and second check valves are positioned between the mechanical pump and the electric pump.

11. The system of claim 10, further comprising a sump and where the mechanical pump and the electric pump draw transmission fluid from the sump.

* * * * *